2,977,287
ENZYME AND METHOD FOR PREPARATION

Alfred Bloch, Highland Park, and Ralph A. Messing, Somerville, N.J., assignors to Ethicon, Inc., a corporation of New Jersey No Drawing. Filed Nov. 25, 1957, Ser. No. 698,367

9 Claims. (Cl. 195—62)

This invention relates to an improved proteolytic enzyme and to methods for its preparation.

Proteolytic enzymes have found wide application in the pharmaceutical industry and in various fields involving processes where enzymatic digestion plays an important role. For example, enzymes are now being used for dehairing hides; in the manufacture of cheese; as chill-proofing agents in the production of beer and as meat tenderizers. In the medical field, enzymes are being used topically in the treatment of ulcers and in the elimination of localized pus areas.

Although a large number of proteolytic enzymes are known and are commercially available, considerable research is being directed toward the investigation of other sources with the object of finding an enzyme material which is superior to those presently at hand. Moreover, although some proteolytic enzymes such as papain have found considerably diversified utilities, more economical sources are desirable.

In 1942 (Science, v. 95, No. 2454, pp. 48–49) Asenjo reported the isolation of a proteolytic enzyme from the fruit of the plant *Bromelia pinguin*, for which he suggested the name "pinguinain." This enzyme was stated to possess an activity of 390 milk-clotting units per gram in solution at pH 5.9; to be reversibly inactivated by hydrogen peroxide and iodine, and activated by sodium cyanide. A 1% solution of the enzyme was purportedly capable of digesting live tissue in less than 12 hours at 40° C., pH 5.5.

Our investigations show that the process described by Asenjo results in poor yields of enzyme. The reason for this loss cannot be postulated with certainty, but one contributory factor is believed to be the use of celite as a filtering agent which results in absorption of the active principle. Moreover, the Asenjo process utilizes sodium cyanide solution as a solvent for the crude precipitate. The use of this obviously toxic agent creates potentially dangerous residual toxic properties in the final product, making its use in large quantities hazardous. Moreover, and perhaps most significantly, the Asenjo product is not indicated for parenteral use, not only because of its toxic properties, but also because of its virtual insolubility and non-homogeneity in pharmaceutical carriers. Thus, although Asenjo described a method of isolating a proteolytically active enzyme, his teaching is of no avail insofar as the preparation of a phamaceutically acceptable product is concerned.

We have discovered a simple and economical method for treating the juice of *Bromelia pinguin* which results in an improved, water-soluble, non-toxic pinguinain product. The improved pinguinain which is obtainable in accordance with our process can be formulated into homogeneous solutions which produce a very rapid proteolytic response and can be safely administered topically and intramuscularly to the animal organism without indication of dangerous side effects. The improved pinguinain is capable of digesting necrotic tissue, but is not capable of digesting viable tissue.

In accordance with our process, the juice of the fruit of *Bromelia pinguin* is removed from the fibrous body by macerating the fruit and forcing the resultant mash through a porous, inert body such as cheesecloth with or without prior extraction with water, as desired; or, more conveniently, by subjecting the whole fruit to excessive pressure by mechanical means, as for example a hydraulic press, and then filtering the resultant juice through cheesecloth or glass wool. The juice obtained in this manner still contains some quantities of debris and inert material which can be removed by more refined purification techniques, such as for example by filtration over paper, glass wool, spun synthetic polymers, e.g., polyethylene, orlon, saran, etc., felt, or by centrifugation.

The resultant clear filtrate, containing the proteolytically active principle has a pH of from about 3.0 to about 5.5, depending on the ripeness of the fruit. This filtrate, which contains nearly the total amount of the enzyme present in the fruit, is now subjected to spray-drying to yield a therapeutically acceptable pinguinain.

In spray-drying, the filtrate is fed into a standard, commercially available spray-dryer whose inlet air stream (inlet temperature) is from about 200° F. to about 250° F., preferably about 250° F., and whose outlet air stream (outlet temperature) is from about 95° F. to about 225° F., preferably from about 163° F. to about 184° F. at a feed temperature of from about 70–100° F., preferably about 80° F. At temperatures above these ranges the enzyme activity is reduced or destroyed, while at temperatures below these ranges a satisfactory drying of the product cannot be obtained. The resulting dried preparation can be stored at room temperature.

The pinguinain product prepared according to the above described procedure is suitable for general use such as beer fermentation, cheese manufacture, as a meat tenderizer, etc. However, we have also found that the product so obtained is sufficiently innocuous to permit its use topically in physiologic debridement. When applied to infected wounds and suppurating lesions on the animal organism, especially such as those artificially induced in laboratory animals, the enzyme is capable of dissolving dead tissue and removing debris without injury to normal tissue. Moreover, the enzymatic action is much more rapid in onset than that obtained with the product described by Asenjo. In addition, the improved spray-dried pinguinain, because of its high solubility in pharmaceutically acceptable media and its low toxicity is suitable for parenteral administration as an anti-flammatory agent.

Although it is not absolutely necessary to subject pinguinain obtained by spray-drying to further refinement, one may, if so desired, apply further purification procedures in order to obtain a more highly active and more pure form of the enzyme, and it is intended that these modifications be included within the scope of this invention. This may be accomplished in any one of several methods or combinations thereof, e.g. precipitation at 0° C. to 25° C. with aqueous ammonium sulfate solution having a salt concentration from about 0.15 saturation to about 0.4 saturation; or fractionation with an aqueous lower alkanol at 0° C. to 25° C., preferably 0° C. to 4° C., e.g. fractionation with 47% to 68% aqueous ethanol; fractionation with 50% to 75% denatured ethanol; fractionation with 47% to 71%, preferably 50% to 64%, aqueous methanol; or by fractionation with 37% to 60% isopropyl alcohol. Preparation of denatured alcohol may be effected in any one of several ways known to those skilled in the art, as for example by the addition of a mixture of aviation gas, butyl alcohol and methyl isobutyl ketone.

Pinguinain is readily distinguishable from other proteolytic enzymes. It is a moiety of unknown chemical structure comprised essentially of three components, two of which (for convenience herein referred to as A and B) are proteinaceous in character and readily characterizable by their mobilities in an electrophoretic field, the third (C) being non-protein and lacking in electrophoretic mobility and proteolytic activity. The electrophoretic mobilities of components A and B, in 0.1 ionic (e.g. acetate glycine-sodium chloride) buffer are given below:

| pH | A Component | B Component |
|---|---|---|
| 3.5 | .376 | .235 |
| 3.6 | .342 | .205 |
| 4.0 | .268 | .150 |
| 4.6 | .175 | .064 |
| 5.0 | .135 | .030 |
| 5.25 | .102 | 0 |
| 5.85 | .070 | —0.023 |

The average electrophoretic mobility in 0.1 ionic glycine buffer at pH 3.5 for A component is 0.377, for B component, it is 0.234. The average mobility in acetate buffer at pH 4.6 for A component is 0.175, for B component it is 0.064. The isoelectric point for B component is pH 5.25 for A component, greater than pH 6.

Pinguinain demonstrates optimal proteolytic activity (against an Azocoll substrate) at a pH from about 5.2 to about 5.5 and at pH 7.3, and is inactivated at temperatures in excess of 80° C. It is not activated by ascorbic acid or sodium bisulfite, but it is activated by sodium thiosulfate and cysteine. It is soluble in water, normal saline and aqueous salt solutions of low ionic strength, i.e. 0.2 molar.

The degree of enzymatic potency of the pinguinain obtained according to the method described herein as ascertainable by means of the well-known Azocoll assay and the strength of the enzyme is expressed in terms of the number of Azocoll units per milligram of enzyme or milliliter of enzyme solution. A convenient [modified Bidwell (Biochem. Journal, 46, pp. 589–598, 1950) and Oakley (Journal of Pathology and Bacteriology, 58, pp. 229–235, 1946)] method for preparing the Azocoll substrate, and the Azocol procedure employed in establishing potency in terms of Azocol units is given below:

Preparation of Azocoll

Eighty grams of dry kangaroo tail tendon, as a source of collagen of high purity, is heated at 150° C. overnight. The heat denatured tendon is then ground to 20 mesh after which the 20 mesh particles are ground to 40 mesh in a Wiley mill.

To an ice cold solution of 0.575 gram of benzidine in 100 ml. of water containing 3 ml. of concentrated hydrochloric acid (in an ice bath), a solution of 0.45 gram of cold sodium nitrite in 10 ml. of water is slowly added, and the resultant solution is allowed to stand for ten minutes. This solution is then added to an ice cold solution of 6.55 grams of sodium acetate in 500 ml. of water. To this solution a solution of 1.27 grams of disodium 2-naphthol-3, 6-disulfonate in 100 ml. of water is added. Then 20 ml. of 0.5 M potassium carbonate is added. A brick red dye is formed.

The 80 grams of 40 mesh kangaroo tail tendon is washed throughly with water and filtered over a Buchner funnel on No. 1 Whatman paper. The tendon is resuspended in 500 ml. of water containing 30 ml. of 1 molar potassium carbonate. The dye is divided into six parts and added to the suspension at ten minute intervals with mild stirring. After all the dye has been added, 25 ml. of 1 molar potassium carbonate is added and the suspension is allowed to stand for ten minutes. The suspension is then filtered over fluted filter paper and washed with 10 liters of water. The dyed tendon, called Azocoll, is then transferred from the fluted paper to a Buchner funnel and washed with acetone until the washings are no longer pink. The Azocoll is then dried overnight at 37° C. The dried Azocoll is reground with a 40 mesh screen in a Wiley mill and redried over calcium chloride under reduced pressure. The product is screened through a 200 mesh screen and particles smaller than 200 mesh are discarded.

Azocoll Procedure

A volume of 2 ml. of appropriately diluted enzyme is placed into a test tube and stoppered. The tube is placed in a shaker water bath at 37° C. and allowed to reach thermal equilibrium. A quantity of 10 milligrams of Azocoll is added to the tube and shaking at 120 oscillations per minute is commenced. The reaction mixture is incubated for 20 minutes with shaking from the time of Azocoll addition. At the end of the incubation period, the reaction is stopped by the addition of 10 ml. of 1.0 M acetic acid. The supernate is transferred to a calibrated cuvette and read against an incubated Azocoll buffer blank on a spectrophotometer at 525 millimicrons.

Definition of Azocoll activity $$\text{Azocoll activity} = \frac{O.D. \times 100 \; C.F.}{T} = \text{units/mg. or units/ml.}$$

O.D.=optical density at 525 millimicrons wave length
C.F.=correction factor for the Azocoll batch used
T=total number of mg. of enzyme or ml. of enzyme solution represented in the 2 ml. reaction mixture In actual practice the improved pinguinain enzyme may be used in the form of aqueous solutions either for topical use or for intramuscular injection. It may also be used in the form of gels suitable for application on burned or ulcerated areas. The quantity of enzyme to be employed in such formulations will depend largely upon the needs of the operator, the condition of the animal organism and the nature of the disease being treated. Advantageously, a formulation for topical application, i.e. an aqueous irrigation solution or a gel should contain in each milliliter or gram at least 5000 Azocoll units of pinguinain. For purposes of injection, an appropriately buffered aqueous solution should contain, in each milliliter from about 1000 to about 20,000 Azocoll units of enzyme. If desired, such formulations may contain other therapeutically active ingredients such as antibiotics, e.g. penicillin, tetracycline, chlortetracycline, etc.; antispetic agents, or sulfonamide derivatives. An anaesthetic agent such as procain may be added. To ensure maximum debriding activity, pinguinain solutions and gels for topical use should be adjusted to a pH from about 3.0 to about 5.0, preferably from about 3.0 to about 4.0. Solutions intended for intramuscular administration against inflammatory conditions should be adjusted to near neutrality. For this purpose one may employ a standard acetate or phosphate buffer.

Among the substances suitable for formulation of pinguinain gels there may be mentioned: vegetable gums such as acacia, tragacanth, ghatti or daraya; mucilages such as those obtained from guar, bean, linseed, the locust bean or other related leguminous plant seeds; and cellulose derivatives such as carboxymethylcellulose, methylcellulose, starch or starch derivatives.

EXAMPLE I 16.5 kilograms of *Bromelia pinguin* fruit were pressed in a Carver press at 15,000 pounds per square inch. The juice was filtered over a felt pad on a Buchner funnel. The yield of juice was 6,200 ml. Another 12.5 kilograms of *Bromelia pinguin* fruit were pressed in a Carver press at 15,000 pounds per square inch. The juice was filtered over a felt pad on a Buchner funnel. The yield of juice was 5,300 ml. The yields were combined and mixed thoroughly. An aliquot of 100 ml. was freeze-dried. Yield: 10.1 g. Azocoll activity: 143 units per mg.

A volume of 10,150 ml. of the filtered juice was spray dried at an inlet temperature of 200° F., an outlet temperature of 163–184° F. and a feed temperature of 80° F., all air ports closed. Percent recovery of Azocoll activity (based on Azocoll activity of pressed juice): 99.2%. Azocoll activity: 165 units per mg.

EXAMPLE II

Twenty-two kilograms of fruit were pressed in a Carver press at 15,000 pounds per square inch. The juice was gravity filtered through glass wool and then centrifuged through canvas in a basket centrifuge. Yield: 7.65 liters. Azocoll activity: 26,200 units per milliliter. Three liters of the juice were lyophilized (A), the remaining 4.65 liters were filtered over celite and lyophilized (B).

|  | A | B |
|---|---|---|
| Yield | 233 grams or 2.7% by weight of fruit. | 347 grams or 2.6% by weight of fruit. |
| Azocoll Activity | 197 units per mg. | 140 units per mg. |
| Azocoll Activity Recovery | 58.5% | 39.9%. |

C. Seventeen kilograms of *Bromelia pinguin* fruit were pressed in a Carver press at 15,000 pounds per square inch. The juice was filtered through a felt pad over a Buchner funnel at 4° C.

| Yield | ml | 6,750 |
|---|---|---|
| Azocoll activity | units per ml | 21,400 |

The juice was then lyophilized.

| Yield | gm | 1,253 |
|---|---|---|
| Azocoll activity | units per mg | 127 |
| Percent by weight of fruit | | 7.4 |
| Azocoll activity recovery | percent | 110 |

These examples substantiate the proposition that the celite filtration of the fruit juice as practiced by Asenjo results in a loss of Azocoll activity. 100% Azocoll activity may be recovered by filtration over a felt pad.

EXAMPLE III

A quantity of twenty grams of pinguinain obtained by lyophilization of the press juice was dissolved in 180 ml. of distilled water. The solution was brought to 0.15 ammonium sulfate saturation by slow addition of solid ammonium sulfate with stirring. The mixture was then centrifuged, the residue was dissolved in water, dialyzed and lyophilized. The supernate was brought to 0.4 saturation with ammonium sulfate and centrifuged. The residue was dissolved in water, dialyzed and lyophilized.

| Fraction | Azocoll Activity, pH 5.35 units/mg. | Percent Recovery |
|---|---|---|
| Crude starting material | 73.5 | |
| 0.15 SAS | 827 | 56.3 |
| 0.4 SAS | 345 | 23.4 |

EXAMPLE IV

Thirty grams of pinguinain obtained by lyophilization of the press juice were dissolved to 300 ml. volume with distilled water. Three hundred milliliters of 95% v./v. ethanol were added to the solution with stirring. The final concentration of alcohol was 47.7% v./v. The mixture was centrifuged. The precipitate was dissolved in 165 ml. of 0.02 magnesium chloride, dialyzed and lyophilized. The supernate was brought to 59.5% v./v. ethanol by the addition of 200 ml. of ethanol and stirring. The mixture was centrifuged and the precipitate was slurried in 100 ml. of distilled water, dialyzed and lyophilized. The supernate was dialyzed and lyophilized.

| Fraction | Azocoll Activity Units per mg. | Percent Recovery |
|---|---|---|
| Crude starting material | 270 | |
| 0-47.8% v./v. ethanol | 31 | |
| 47.8-59.5% v./v. ethanol | 2,320 | 51.0 |
| 59.5% v./v. ethanol supernate | 1,630 | 11.4 |

EXAMPLE V 200 grams of pinguinain obtained through lyophilization of press juice were dissolved up to two liters in distilled water and fractionated with ethanol as in Example IV.

| | Azocoll Activity Units per mg. | Percent Recovery Azocoll Activity |
|---|---|---|
| 0-47.5% | | |
| 47.5-67.8% | 4,633 | 100 |

EXAMPLE VI

One gram of lyophilized pinguinain was dissolved to 10 ml. volume in distilled water. The solution was brought to 47.5% v./v. ethanol by the addition, with stirring, of 10 ml. of 95% v./v. ethanol. The mixture was centrifuged and the residue was dissolved in 10 ml. volume of 0.2 M magnesium sulfate, dialyzed and lyophilized. The supernate was brought to 67.8% v./v. ethanol by the addition of 15 ml. of 95% v./v. ethanol. The mixture was centrifuged and the precipitate was dissolved in 70 ml. of 0.2 M magnesium chloride, dialyzed and lyophilized.

| Fraction | Azocoll Activity Units/mg. pH 5.35 | Percent Recovery |
|---|---|---|
| Crude starting material | 270 | |
| 0-47.5% v./v. ethanol | 50 | |
| 47.5-67.8 v./v. ethanol | 2,760 | 69.7 |
| 67.8 v./v. ethanol | 6 | |

EXAMPLE VII 3.5 kilograms of *Bromelia pinguin* fruit were pressed in a hydraulic press at 15,000 pounds per square inch. The juice was filtered through a felt pad on a Buchner funnel. The yield of filtrate was 1810 ml. Azocoll activity: 23,600 units per ml.

Six hundred milliliters of the filtrate were brought to 45.5% v./v. concentration with denatured ethanol with stirring. The mixture was centrifuged and the precipitate was dissolved in distilled water and lyophilized.

The supernate was brought to 48.5% v./v. concentration with denatured ethanol with stirring and the mixture was centrifuged. The precipitate was dissolved in distilled water and lyophilized.

The supernate was brought to 53.6% v./v. concentration with denatured ethanol with stirring and the mixture was centrifuged. The precipitate was dissolved in 0.1 M magnesium chloride, dialyzed and lyophilized.

The supernate was brought to 58.0% v./v. concentration with denatured ethanol and the mixture was centrifuged. The precipitate was dissolved in 0.2 M magnesium chloride, dialyzed and lyophilized.

The supernate was brought to 70% v./v. concentration with denatured ethanol with stirring, and the mixture was centrifuged. The precipitate was dissolved in 0.1 M magnesium chloride. The supernate was discarded.

| Fraction | Azocoll Activity | Percent Recovery |
| --- | --- | --- |
| Crude starting material | 23,600 units/ml | |
| 0–45.5% v./v. denatured ethanol | 43 units/mg | 14.1 |
| 45.5%–48.5% denatured ethanol | 100 units/mg | 1.5 |
| 48.5%–53.6% denatured ethanol | 225 units/mg | 3.7 |
| 53.6%–58.0% denatured ethanol | 1,170 units/mg | 16.8 |
| 58.0%–70% denatured ethanol | 3,900 units/mg | 38.5 |

EXAMPLE VIII

Fifty grams of pinguinain, obtained through lyophilization of press juice (Azocoll activity, 127 units per mg.) were dissolved in 450 ml. of distilled water. The volume of the solution was 470 ml. The solution was brought to 50% solvent by the addition of 470 ml. of denatured alcohol at 4° C. with stirring. The mixture was centrifuged and the precipitate was dissolved in distilled water, dialyzed and lyophilized. The supernate (840 ml.) was brought to 75% solvent concentration by the addition of 840 ml. of denatured alcohol at 4° C. with stirring. The mixture was centrifuged and the precipitate was dissolved in 0.05 M magnesium chloride, dialyzed and lyophilized. The supernate was dialyzed and lyophilized.

| | 0–50% denatured ethanol fraction | 50–75% denatured ethanol fraction | Supernate of 75% denatured ethanol |
| --- | --- | --- | --- |
| Yield, g | 14.19 | 2.276 | 5.0 |
| Azocoll Activity, units per mg | 63 | 2,150 | 7 |
| Recovery of Azocoll Activity, percent | 14.1 | 76.8 | 0.6 |

EXAMPLE IX

Five kilograms of Bromelia pinguin fruit were pressed in a hydraulic press at 15,000 pounds per square inch. The juice was filtered through a felt pad on a Buchner funnel. The yield of filtrate was 1,940 ml. Azocoll activity: 25,000 units per ml. Five hundred forty milliliters of denatured ethanol were added at 0° C. with stirring to 540 ml. of the filtrate to bring the mixture to 50% v./v. solvent denatured ethanol. The precipitate formed, was allowed to settle, and the supernate was decanted through glass wool. The precipitate was discarded.

The filtered supernate was brought to 75% concentration with denatured ethanol, with stirring, at 4° C. (by the addition of 835 ml. of solvent). The precipitate was allowed to settle. The supernate was decanted and discarded. The precipitate was transferred to a Buchner funnel with #50 Whatman filter paper and washed with 200 ml. of 75% denatured alcohol. The precipitate was then washed with 200 ml. of ether and air-dried on the Buchner funnel. The precipitate was transferred to a lyophilizing flask and further dried under vacuum.

Yield _____ grams__ 4.611
Azocoll activity _____ units per mg__ 2,000
Percent recovery Azocoll activity _____ 68.3

EXAMPLE X

On gram of pinguinain obtained by lyophilization of press juice (Azocoll activity, 270 units per mg.) was dissolved to 10 ml. with distilled water. The solution was brought to 37.1% isopropanol concentration by the addition of 6 ml. of 99% isopropanol with stirring at 4° C. The mixture was centrifuged and the precipitate was dissolved in 0.2 M calcium chloride, dialyzed and lyophilized. The supernate was brought to 59.5% isopropanol by the addition of 99% isopropanol with stirring at 4° C. The mixture was centrifuged and the precipitate was dissolved in 0.2 M calcium chloride, dialyzed and lyophilized. The supernate was dialyzed and lyophilized.

| | 0–37.1% | 37.1–59.5% | Supernate |
| --- | --- | --- | --- |
| Yield, mg | 235 | 110 | 30 |
| Azocoll Activity, units/mg | 35 | 996 | 48 |
| Recovery of Azocoll Activity, percent | 31.2 | 40.7 | 0.5 |

EXAMPLE XI

Three kilograms of fruit were pressed at 15,000 pounds per square inch. The juice was filtered through a felt pad under reduced pressure. Yield: 1470 ml. of filtered juice. Azocoll activity: 26,000 units per ml.

A. A 450 ml. volume of filtered juice was lyophilized.

Yield _____ g__ 39.25
Azocoll activity _____ units per mg__ 265
Percent recovery (Azocoll Activity) _____ 89

B. A 1000 ml. volume of filtered juice was filtered over celite and prepared according to Asenjo's procedure.

Yield _____ g__ 24.35
Azocoll activity _____ units per mg__ 256
Percent recovery _____ 49.5

EXAMPLE XII

Three kilograms of Bromelia pinguin were pressed at 15,000 pounds per square inch. Total yield after filtration through felt pad: 1260 ml.

A. A 200 ml. volume of filtered juice was lyophilized.

Yield _____ g__ 34.96
Azocoll activity _____ units per mg__ 120

B. A 300 ml. volume was processed according to Asenjo's method.

Yield _____ g__ 18.4
Azocoll activity _____ units per mg__ 160

Percent activity recovery based on recovery of lyophilized material: 46.8%.

C. A 300 ml. volume was precipitated at 0.4 saturation with ammonium sulfate as in Example III.

Yield _____ g__ 5.45
Azocoll activity _____ units per mg__ 920

Percent activity recovery based on recovery of lyophilized material: 80%.

D. The remaining 460 ml. volume was precipitated at 50–75% concentration with denatured ethanol as in Example III.

Yield _____ g__ 5.31
Azocoll activity _____ units per mg__ 1,000

Percent activity recovery based on recovery of lyophilized material: 56.3%.

EXAMPLE XIII

A series of in vitro tests on guinea pig eschar was conducted to establish the debriding powers of the product obtained by the spray-drying process of this invention and its various modifications. A description of the test employed and the results obtained follow.

The hair is removed from a guinea pig back with an animal hair clipper. The animal is then injected with sodium nembutol. The animal's back is then immersed in a water bath at 70° C. for 45 seconds. A burned area of about 2 to 3 inches in diameter is formed as a result of this immersion. Seven days after the animal has been burned, it is sacrificed and the eschar is harvested. The eschar is removed from the animal with a scalpel and stored in the frozen state unitl needed for use.

Immediately before use, while it is still in the frozen state, the eschar is cut into pieces 1 x 1 cm. for a 5 ml. volume of reaction mixture, 1 x 2 cm. for a 10 ml. volume of reaction mixture and 1 x 3 cm. for a 15 ml. volume of reaction mixture. The reaction mixture contains a metal ion concentration of 0.2–0.25 M. The eschar pieces are permitted to thaw about 10 minutes before they are placed in the reaction mixtures.

The reaction mixture, adjusted to pH 4.0–4.5, containing a piece of eschar is incubated in an oven at 37° C. for between 16 and 18 hours. The eschar is then inspected visually and the activity of the preparation is evaluated.

The term "reaction mixture" as used in these tests means the mixture comprising the eschar substrate, the enzyme and the particular carrier employed, e.g. water.

| Product | Azocoll Activity, Units per ml. | Result |
| --- | --- | --- |
| Spray dried | 165×10² | Eschar completely disintegrated. |
| Lyophilized | 140×10² | Do. |
| Ethanol pptd | 464×10² | Do. |
| Denatured ethanol pptd | 525×10² | Do. |
| Ammonium sulfate pptd | 207×10² | Do. |
| Isopropanol | 182×10² | Do. |

EXAMPLE XIV

A series of in vivo tests on guinea pig eschar was conducted to differentiate between the debriding powers of the Asenjo product and the improved pinguinain obtained by the process of this invention. A description of the test employed and the results obtained follow.

The hair is removed from a guinea pig back with an animal hair clipper. The animal is then injected with sodium nembutol. The animal's back is then immersed in a water bath at 70° C. for 45 seconds. A burned area of about 2 to 3 inches in diameter is formed as a result of this immersion. Seven days after the burn, the animal is treated with the enzyme preparation, applied in ointment form to the burned area on three successive days. The ointment is covered with a plastic film which is kept in place by adhesive tape. Observations of the percentage of the eschar which was debrided on each animal tested were recorded each day that the bandages were removed. The bandage is removed and the eschar is observed on the first, second and third days after the initial application of enzyme.

The aqueous ointment base employed in these tests consisted of 3 g. of guar gum, 1.8 g. of enzyme and 30 ml. of water. The enzyme and gum were mixed in a dry state and added to the water immediately before use.

Key: A=Asenjo enzyme; B=Spray dried pinguinain.

The figure "percent debridement" represents the percentage of the eschar which was debrided on the animal tested. Complete cleaning of the wound to the viable graft tissue is considered 100%.

| Enzyme | Percent Debridement | | |
| --- | --- | --- | --- |
| | 1st day | 2nd day | 3rd day |
| A | 0 | 85 | 90 |
| | 0 | 20 | 30 |
| | 0 | 10 | 40 |
| B | 40 | 95 | 100 |
| | 25 | 85 | 100 |
| | 25 | 95 | 100 |

What is claimed is:

1. A method for preparing improved pinguinain which comprises the steps of pressing the fruit of Bromelia pinguin, separating the resulting juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with a member selected from the group consisting of an aqueous ammonium sulfate solution having a salt concentration from about 0.15 saturation to about 0.4 saturation and an aqueous lower alkanol at a concentration of from about 37 to 71%, said fractionation being accomplished at a temperature from about 0° C. to about 25° C.

2. A method as set forth in claim 1 wherein the juice is separated by filtration through felt.

3. A method as set forth in claim 1 wherein the juice is separated by filtration through glass wool.

4. A method as set forth in claim 1 wherein the juice is separated by centrifugation.

5. A method for preparing improved pinguinain which comprises the steps of pressing the fruit of Bromelia pinguin, separating the juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with an aqueous ammonium sulfate solution having a salt concentration from about 0.15 saturation to about 0.4 saturation at a temperature from about 0° C. to 25° C.

6. A method for preparing improved pinguinain which comprises the steps of pressing the fruit of Bromelia pinguin, separating the juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with from about 47% to about 68% aqueous ethanol.

7. A method for preparing improved pinguinain which comprises the steps of pressing the fruit of Bromelia pinguin, separating the juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with from about 50% to about 75% denatured alcohol.

8. A method for preparing improved pinguinain which comprises the steps of pressing the fruit of Bromelia pinguin, separating the juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with from about 47% to about 71% aqueous methanol.

9. A method for preparing improved pinguinain which comprises the steps of pressing the fruit of Bromelia pinguin, separating the juice, spray drying the same at an inlet temperature of from about 200° F. to about 250° F., at an outlet temperature of from about 95° F. to about 225° F. and at a feed temperature of from about 70° F. to about 100° F. and fractionating an aqueous solution of the dried enzyme so obtained with from about 37% to about 60% isopropyl alcohol.

References Cited in the file of this patent

UNITED STATES PATENTS

| | | |
| --- | --- | --- |
| 1,679,250 | Lind | July 31, 1928 |
| 1,892,247 | Neugebauer | Dec. 27, 1932 |
| 2,072,955 | Lunt | Mar. 9, 1937 |
| 2,773,002 | Conners et al. | Dec. 4, 1956 |

OTHER REFERENCES

Methods in Enzymology, by Colowick et al., vol. II, Academic Press Inc., New York (1955) (p. 63 relied on).

Chemistry and Technology of Enzymes, by Tauber. John Wiley & Sons, Inc. (1949) (pages 161, 165 and 167 relied on).

Annual Review of Biochemistry, by Luck et al., Annual Reviews Inc., Stanford, Calif., vol 17, page 55.

Annals of New York Academy of Sciences, vol. 54, No. 2, pages 191–194 (May 1951).

Science, vol. 95, pages 48 and 49 (1942).